(12) United States Patent
Hachiya

(10) Patent No.: US 11,108,879 B2
(45) Date of Patent: Aug. 31, 2021

(54) TRANSFER SERVER AND CONTROLLING METHOD

(71) Applicant: CANON KABUSHIKI KAISHA, Tokyo (JP)

(72) Inventor: Hiroki Hachiya, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 168 days.

(21) Appl. No.: 15/895,814

(22) Filed: Feb. 13, 2018

(65) Prior Publication Data

US 2018/0241833 A1    Aug. 23, 2018

(30) Foreign Application Priority Data

Feb. 20, 2017 (JP) .............................. JP2017-029403

(51) Int. Cl.
*H04L 29/08* (2006.01)
*G06F 3/12* (2006.01)
(Continued)

(52) U.S. Cl.
CPC ........ *H04L 67/2814* (2013.01); *G06F 3/1229* (2013.01); *G06F 16/955* (2019.01);
(Continued)

(58) Field of Classification Search
CPC ............. H04L 67/2814; H04L 63/0876; H04L 67/146; H04L 29/08; H04L 29/06; H04L 63/168; G06F 3/1229; G06F 3/121; G06F 17/30876; G06F 3/0482; G06F 16/955; G06F 3/12; G06F 17/30; G06F 3/1235; G06Q 30/06
(Continued)

(56) References Cited

U.S. PATENT DOCUMENTS 7,921,175 B2    4/2011 Noguchi ...................... 709/207
8,228,535 B2    7/2012 Nimura et al. ............ 358/1.15
(Continued)

FOREIGN PATENT DOCUMENTS

JP    2003-187124    7/2003
JP    2005-059303    3/2005
(Continued)

OTHER PUBLICATIONS

Office Action dated Sep. 29, 2020 in counterpart Japanese Application No. 2017-029403, together with English translation thereof.

*Primary Examiner* — Tonia L Dollinger
*Assistant Examiner* — Mehulkumar J Shah
(74) *Attorney, Agent, or Firm* — Venable LLP

(57) ABSTRACT

A transfer server according to the present invention is a transfer server guiding an access request from a client terminal to a site that is a redirect destination and includes a reception unit configured to receive an access request for a site providing a support service relating to a device connected to the client terminal, a generation unit configured to generate an address for accessing a site providing a support service requiring in-advance registration in a case where the device is a target for the support service requiring the in-advance registration, and a transmission unit configured to transmit an access response having the generated address set as a redirect destination to the client terminal.

18 Claims, 15 Drawing Sheets

(51) Int. Cl.
  *H04L 29/06* (2006.01)
  *G06Q 30/06* (2012.01)
  *G06F 16/955* (2019.01)
  *G06F 3/0482* (2013.01)
(52) U.S. Cl.
  CPC ........... *G06Q 30/06* (2013.01); *H04L 67/146* (2013.01); *G06F 3/0482* (2013.01); *G06F 3/121* (2013.01); *G06F 3/1235* (2013.01); *H04L 63/0876* (2013.01); *H04L 63/168* (2013.01)
(58) Field of Classification Search
  USPC .................................. 709/219, 217; 375/219
  See application file for complete search history.

(56) References Cited

U.S. PATENT DOCUMENTS

| | | | | |
|---|---|---|---|---|
| 2003/0004832 A1* | 1/2003 | Kamimoto | ............ | G06Q 30/06 705/26.41 |
| 2003/0142338 A1* | 7/2003 | Campbell | ............ | G06Q 10/087 358/1.14 |
| 2006/0161658 A1* | 7/2006 | Noguchi | ............ | G03G 15/502 709/225 |
| 2008/0126228 A1* | 5/2008 | Nagai | ................ | G06Q 20/202 705/28 |
| 2009/0009797 A1 | 1/2009 | Nimura et al. | ............... | 358/1.15 |
| 2012/0050794 A1* | 3/2012 | Ikeda | .................... | G06F 3/1205 358/1.15 |
| 2013/0314746 A1* | 11/2013 | Tsutsumi | ............ | G06F 3/1203 358/1.15 |
| 2016/0292774 A1* | 10/2016 | Ohara | ................ | G06Q 30/0223 |
| 2017/0090830 A1* | 3/2017 | Tomono | ................ | G06F 3/1235 |
| 2018/0176413 A1* | 6/2018 | Nagasaki | ............... | G06F 3/1235 |

FOREIGN PATENT DOCUMENTS

| | | |
|---|---|---|
| JP | 2006-155534 | 6/2006 |
| JP | 2008-269559 | 11/2008 |

* cited by examiner

| SUPPORT SERVICE REGISTRATION INFORMATION | SERVICE OVERVIEW | SUPPORT SERVICE URL BASIC PORTION | ADDED ARGUMENT |
|---|---|---|---|
| 0 | ALL NOT REGISTERED | http://www.def/nosupport? | PRINTER MODEL AND INK REMAINING AMOUNT |
| 1 | SERVICE A (AUTOMATIC DELIVERY) REGISTERED | http://www.aaa/support?service=a& | PRINTER ID, REGION, PRINTER MODEL, AND INK REMAINING AMOUNT |

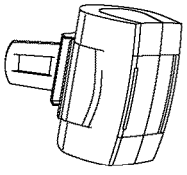

INK TANK PURCHASE RECEPTION SCREEN

700b

701b

YOUR PRINTER : F900

702b

PRODUCT LIST

| | | |
|---|---|---|
| Y: YELLOW | QUANTITY ☐ | xxxx YEN (ADD IT TO CART) |
| M: MAGENTA | QUANTITY 1 | xxxx YEN (ADD IT TO CART) |
| C: CYAN | QUANTITY ☐ | xxxx YEN (ADD IT TO CART) |
| BK: BLACK | QUANTITY ☐ | xxxx YEN (ADD IT TO CART) |
| PM: PHOTO MAGENTA | QUANTITY 1 | xxxx YEN (ADD IT TO CART) |
| PC: PHOTO CYAN | QUANTITY ☐ | xxxx YEN (ADD IT TO CART) |

| SUPPORT SERVICE | REGION | EXECUTION STATUS | SUPPORT SERVICE URL BASIC PORTION |
|---|---|---|---|
| SUPPORT SERVICE A | jp | 1 | – |
| | us | 1 | – |
| | fr | 1 | – |
| SUPPORT SERVICE B | jp | 1 | – |
| | us | 0 | http://www.def/nosupport? |
| | fr | 0 | http://www.def/nosupport? |
| ⋮ | ⋮ | ⋮ | ⋮ |

FIG.11A

| SUPPORT SERVICE | PRINTER MODEL | EXECUTION STATUS | SUPPORT SERVICE URL BASIC PORTION |
|---|---|---|---|
| SUPPORT SERVICE A | F900 | 1 | – |
| | F800 | 1 | – |
| | F600 | 0 | http://www.def/nosupport? |
| SUPPORT SERVICE B | F900 | 1 | – |
| | F800 | 0 | http://www.def/nosupport? |
| | F600 | 0 | http://www.def/nosupport? |
| ⋮ | ⋮ | ⋮ | ⋮ |

FIG.11B

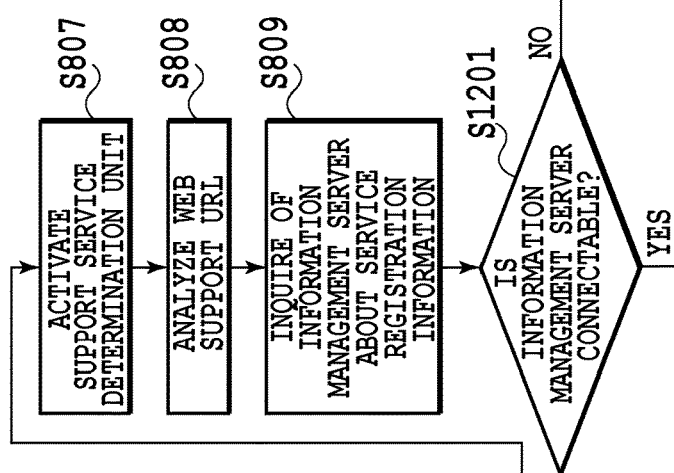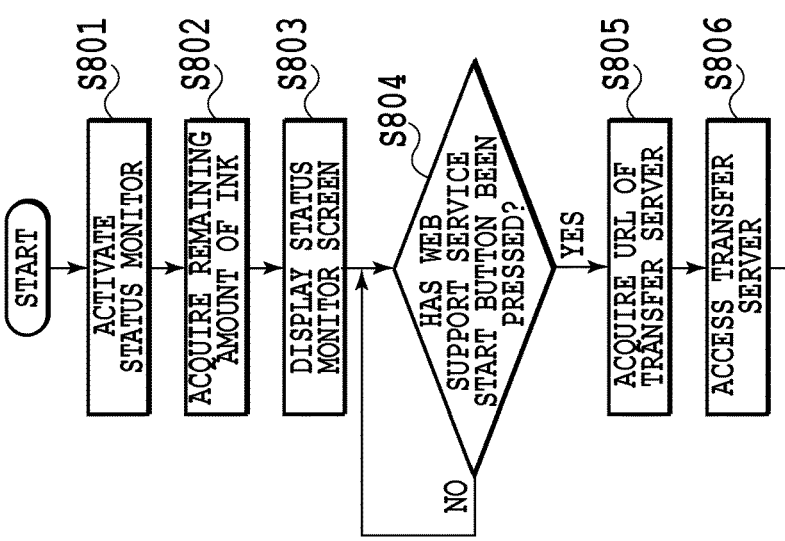
FIG.12A

| PRINTER ID | LATEST REGISTRATION INFORMATION OF SUPPORT SERVICE A | LATEST REGISTRATION INFORMATION OF SUPPORT SERVICE B | ... |
|---|---|---|---|
| 123456789 | a | b | ... |
| 111111111 | 0 | b | ... |
| 222222222 | 0 | 0 | ... |
| ... | ... | ... | ... |

TRANSFER SERVER AND CONTROLLING METHOD

BACKGROUND OF THE INVENTION

Field of the Invention

The present invention relates to a transfer server guiding an access request from a client terminal to a redirect destination, a method of controlling a transfer server and a method executed in an information processing apparatus.

Description of the Related Art

Support services for printers provided through the Internet are practically used. As such a support service, for example, a support service for guiding to online shopping sites selling ink tanks for replacement in a case where the remaining amount of ink of a printer is small is practically used.

In a support service system disclosed in Japanese Patent Laid-Open No. 2005-059303, the model information and the remaining amount of ink of a printer are notified from a client terminal to a server. The server generates screen information (HTML) of sites selling ink tanks for replacement and transmits this screen information to the client terminal in accordance with the notification of the model information and the remaining amount of ink of the printer from the client terminal. At this time, an ink tank having a small remaining amount of ink may be displayed with being emphasized.

SUMMARY OF THE INVENTION

The present invention is made in consideration of the problems described above, and an object thereof is to provide a screen display process enabling improved user's convenience.

A transfer server according to the present invention is a transfer server guiding an access request from a client terminal to a site that is a redirect destination and includes a reception unit configured to receive an access request for a site providing a support service relating to a device connected to the client terminal, a generation unit configured to generate an address for accessing a site providing a support service requiring in-advance registration in a case where the device is a target for the support service requiring the in-advance registration, and a transmission unit configured to transmit an access response having the generated address set as a redirect destination to the client terminal.

Further features of the present invention will become apparent from the following description of exemplary embodiments (with reference to the attached drawings).

BRIEF DESCRIPTION OF THE DRAWINGS

FIG. 6 is a diagram that illustrates one example of a transfer destination table according to Embodiments 1 and 4;

FIGS. 7A and 7B are diagrams that illustrate one example of support service screens according to Embodiment 1;

FIGS. 11A and 11B are diagrams that illustrate one example of support service execution status tables according to Embodiment 2;

FIG. 12 is a diagram showing the relationship of FIGS. 12A and 12B;

FIG. 12A is a flowchart that illustrates the processing sequences of a client terminal and a transfer server according to Embodiment 3;

FIG. 13 is a diagram that illustrates one example of a registration information retaining table according to Embodiment 3.

DESCRIPTION OF THE EMBODIMENTS

However, a support service system disclosed in Japanese Patent Laid-Open No. 2005-059303 only guides to online shopping sites selling merely ink tanks. For example, among users, there are users who do not need to be guided to online shopping sites in accordance with an application for the use of a special service. However, in the technique disclosed in Japanese Patent Laid-Open No. 2005-059303, such users who do not need to be guided to online shopping sites are not considered.

Hereinafter, embodiments for carrying out the present invention will be described with reference to the drawings. However, components descried in these embodiments are merely examples and are not for the purpose of limiting the scope of the present invention thereto.

Embodiment 1

Figure 1:
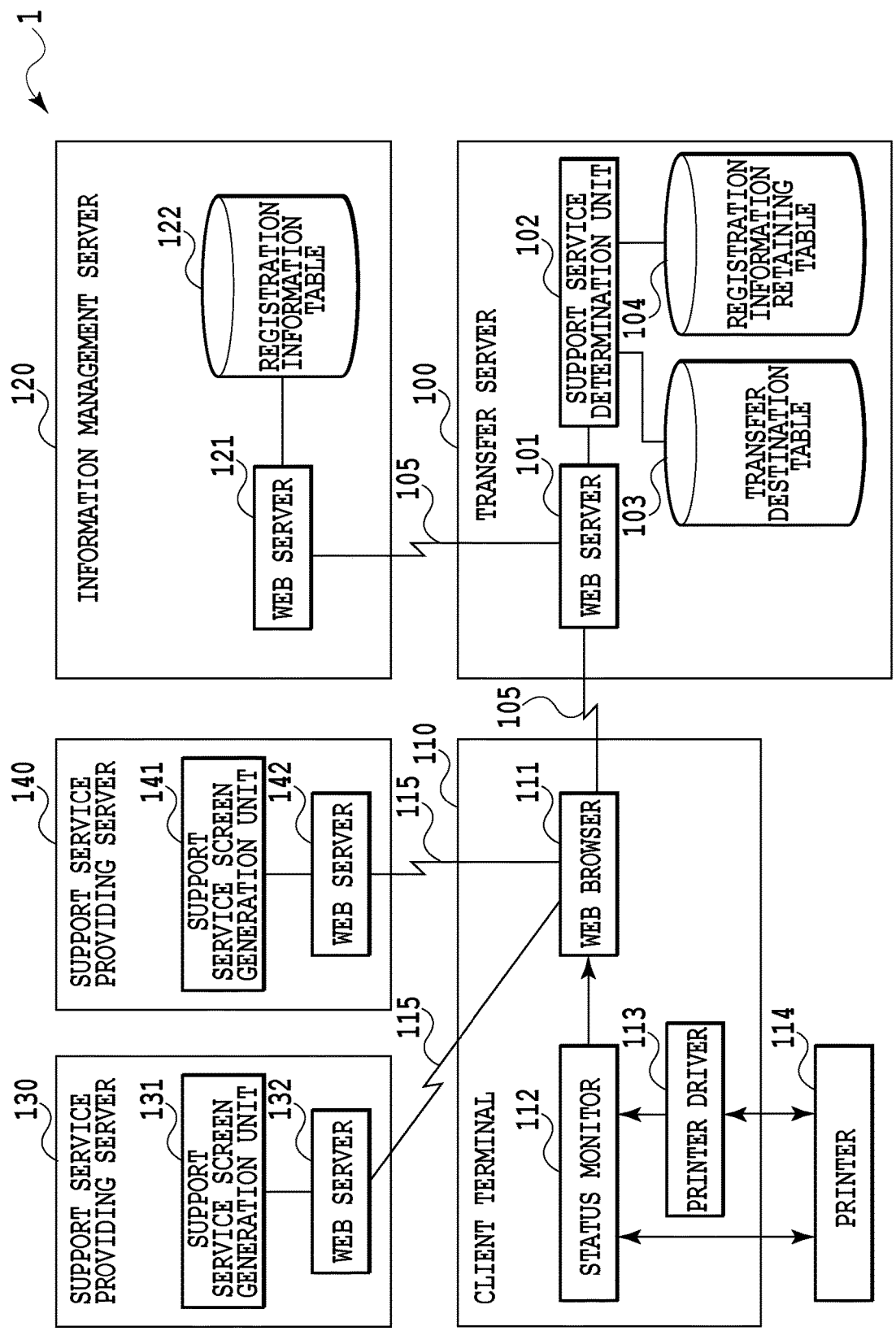
FIG. 1 is a whole configuration diagram of a support service providing system according to Embodiment 1.

FIG. 1 is a whole configuration diagram of a support service providing system 1 according to the present embodiment. Hereinafter, the configurations of a transfer server 100, a client terminal 110, an information management server 120, and support service providing servers 130 and 140 according to the present embodiment will be described with reference to FIG. 1.

The transfer server 100, the information management server 120, and the support service providing servers 130 and 140 form an information processing apparatus group realizing a function providing a support service in accordance with an access request transmitted from the client terminal 110. The transfer server 100, the information management server 120, and the client terminal 110 are interconnected to be communicable through a network 105. Similarly, the support service providing servers 130 and 140 are connected to be communicable with the client terminal 110 through a network 115. The networks 105 and 115 are the Internet, a local area network (LAN), and the like and enable communication among the information processing apparatus group. At least one or more devices are connected to the client terminal 110, and the support service providing system 1 according to the present embodiment provides a support service relating to the devices connected to the client terminal 110. In the present embodiment, an example is illustrated in which a printer 114 is connected to the client terminal 110. More specifically, an ink jet printer, a laser beam printer of an electrographic system, or the like corresponds to the printer 114.

The client terminal 110 includes a web browser 111, a status monitor 112, and a printer driver 113. The web browser 111 operates on the client terminal 110 and can acquire screen information from a web server operating on the transfer server 100 or the support service providing servers 130 and 140 through the networks 105 and 115. The screen information according to the present embodiment, for example, is described in an HTML, and the web browser 111 can analyze an HTML file acquired from the web server and display a predetermined screen on the web browser 111 (display unit 205).

The status monitor 112 can acquire the status of the printer 114 by communicating with the printer 114 through the printer driver 113 or directly communicating with the printer 114. In addition, the status monitor 112 has a function for displaying the status of the printer 114 on the display unit 205. The status monitor 112 is operated when a predetermined event occurs in the printer 114. The status monitor 112, for example, is operated in a case where the remaining amount of ink of the printer 114 is determined to be small on the basis of information acquired from the printer 114, a case where paper jam is determined to occur in the printer 114, or the like. Then, the status monitor 112 displays the status of the printer 114 and displays information relating to the supplement of ink or information for resolving an error such as paper jam on the display unit 205. Not only in a case where a predetermined event occurs but also in a case where a user inputs a predetermined operation, the status monitor 112 can be operated at an arbitrary timing. In addition, the status monitor 112 has a function for accessing a site that sells ink tanks for replacement. For example, in a case where a button (a button 401 illustrated in FIG. 4) for using a web service to be described later is pressed by a user, the status monitor 112 notifies an external server of information of a printer model, the remaining amount of ink, and the like through the web browser 111. In addition, the status monitor 112 performs a display control process for displaying a web page on the web browser 111 as a process illustrated in FIG. 8 to be described later is performed.

The printer driver 113 is software used for controlling the printer 114 and performs a print direction for the printer 114 on the basis of a print command issued from application software mainly under the management of an operating system of the client terminal 110. When a notification is received from the printer driver 113, the web browser 111, first, transmits an access request including the information described above to the transfer server 100. Thereafter, the web browser 111 analyzes an access response transmitted from the transfer server 100 and starts an access to the support service providing servers 130 and 140 on the basis of an address of a redirect destination included in the access response. An address according to the present embodiment, for example, is a uniform resource locator (URL) representing a location and an acquisition technique of information on a network. The web browser 111 can specify an acquisition destination of screen information from a URL input from the web browser 111 or an URL notified from the transfer server 100. In the whole configuration diagram of the system illustrated in FIG. 1, while an example in which one printer 114 is connected to the client terminal 110 is illustrated, a plurality of printers may be connected to the client terminal 110. In such a case, a plurality of printer drivers that are necessary for controlling the plurality of printers are present on the client terminal 110.

The transfer server 100 includes a web server 101, a support service determination unit 102, a transfer destination table 103, and a registration information retaining table 104. The transfer server 100 guides an access request received from the client terminal 110 to the support service providing servers 130 and 140 that are redirect destinations. More specifically, the transfer server 100 analyzes a web support URL included in the access request received from the client terminal 110 and acquires the status of the printer 114. Then, the transfer server 100 generates a support service URL used for accessing a site providing a support service that is appropriate for the status of the printer 114 and notifies the client terminal 110 of the generated support service URL.

The web server 101 receives an access request from the web browser 111 through the network 105 and transmits a response to the access request to the web browser 111.

The support service determination unit 102 analyzes a web support URL included in the access request received from the client terminal 110 and acquires the status of the printer 114. Then, the transfer server 100 generates a support service URL used for accessing a site providing a support service that is appropriate for the status of the printer 114 and notifies the client terminal 110 of the generated support service URL through the web browser 111.

The transfer destination table 103 is a data table stored in an HDD 206 of the transfer server 100 or the like. The transfer destination table 103 is referred to when the support service determination unit 102 generates a support service URL. Details of the transfer destination table 103 will be described later with reference to FIG. 6.

The registration information retaining table 104 is a data table that is stored in the HDD 206 of the transfer server 100 or the like. The registration information retaining table 104 is referred to when the support service determination unit 102 generates a support service URL. Details of the registration information retaining table 104 will be described later with reference to FIG. 13.

Figure 7B:
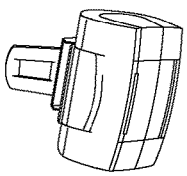

The support service providing servers 130 and 140 respectively include support service screen generation units 131 and 141 and web servers 132 and 142. Each of the support service screen generation units 131 and 141 generates screen information used for displaying a screen in the web browser 111 in accordance with an access request received from the web browser 111. In the present embodiment, the address of the web server that is a redirect destination is changed in accordance with whether the printer 114 is registered in a support service requiring in-advance registration or is registered in a support service not requiring in-advance registration. Based on screen information generated by the support service screen generation units 131 and 141, screen displays as in FIGS. 7A and 7B are performed by the web browser 111. The display screens illustrated in FIGS. 7A and 7B will be described later.

In addition, each of the support service screen generation units 131 and 141 analyzes a support service URL included in the access request transmitted from the web browser 111 and generates screen information in accordance with the status of the printer 114. For example, in a case where the type of ink of which the remaining amount is small is detected as a result of the analysis of the support service URL, screen information used for displaying a delivery status screen (FIG. 7A) or a purchase reception screen (FIG. 7B) for the type of ink is generated. Alternatively or additionally, each of the support service screen generation units 131 and 141 can also generate screen information including an area used for displaying a point balance acquired as a result of the analysis of the support service URL. In the example illustrated in FIG. 1, although two support service providing servers are present, an access request from the client terminal 110 may be guided to one of three or more support service providing servers by the transfer server 100.

The information management server 120 includes a web server 121 and a registration information table 122. The registration information table 122 is a data table that is stored in the HDD 206 of the information management server 120 or the like. The registration information table 122 is referred to when the support service determination unit 102 generates a support service URL. Details of the registration information table 122 will be described later with reference to FIG. 5.

Figure 2:
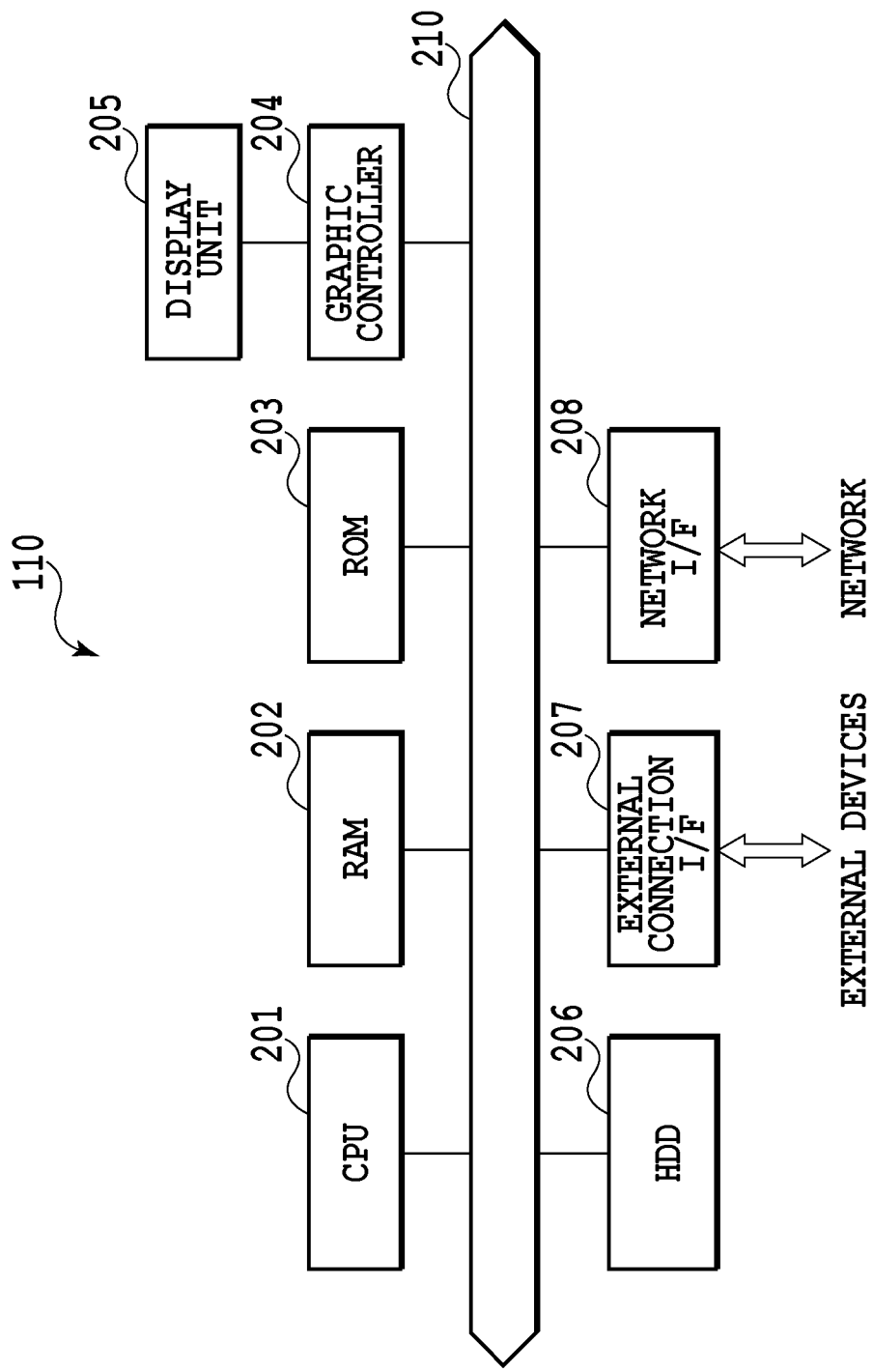
FIG. 2 is a hardware configuration diagram of an information processing apparatus according to Embodiment 1.

FIG. 2 is a block diagram that illustrates the hardware configuration of the client terminal 110 according to the present embodiment. The client terminal 110 is configured to include a CPU 201, a RAM 202, a ROM 203, a graphic controller 204, a display unit 205, and a hard disk drive (HDD) 206. In addition, the client terminal 110 includes an external connection interface (hereinafter, an interface will be represented as an "I/F") 207 and a network I/F 208, and the constituent units thereof are communicably connected through a bus 210. The CPU 201 is formed using an arithmetic operation circuit and integrally controls the client terminal 110. The CPU 201 reads a program stored in the ROM 203 or the HDD 206 into the RAM 202 and executes various processes. The ROM 203 stores a system program and the like used for controlling the client terminal 110. The graphic controller 204 generates a screen used for displaying a screen on the display unit 205. The HDD 206 has a function of a storage area and stores application programs and the like executing various processes. The HDD 206 is one example of a storage device and may be configured by a solid state drive (SSD) or the like other than an HDD. The external connection I/F 207 is an interface used for connecting various devices to the client terminal 110. For example, a display, a keyboard, a mouse, and the like may be connected to the client terminal 110 through the external connection I/F 207. The network I/F 208 communicates with the transfer server 100 and the like under the control of the CPU 201. The hardware configuration of the client terminal 110 illustrated in FIG. 2 is a general configuration of an information processing apparatus. For this reason, also the transfer server 100, the information management server 120, and the support service providing servers 130 and 140 can be realized by an information processing apparatus having the hardware configuration illustrated in FIG. 2. In the present embodiment, the CPU 201 may be also simply referred to as a computer.

Figure 3:
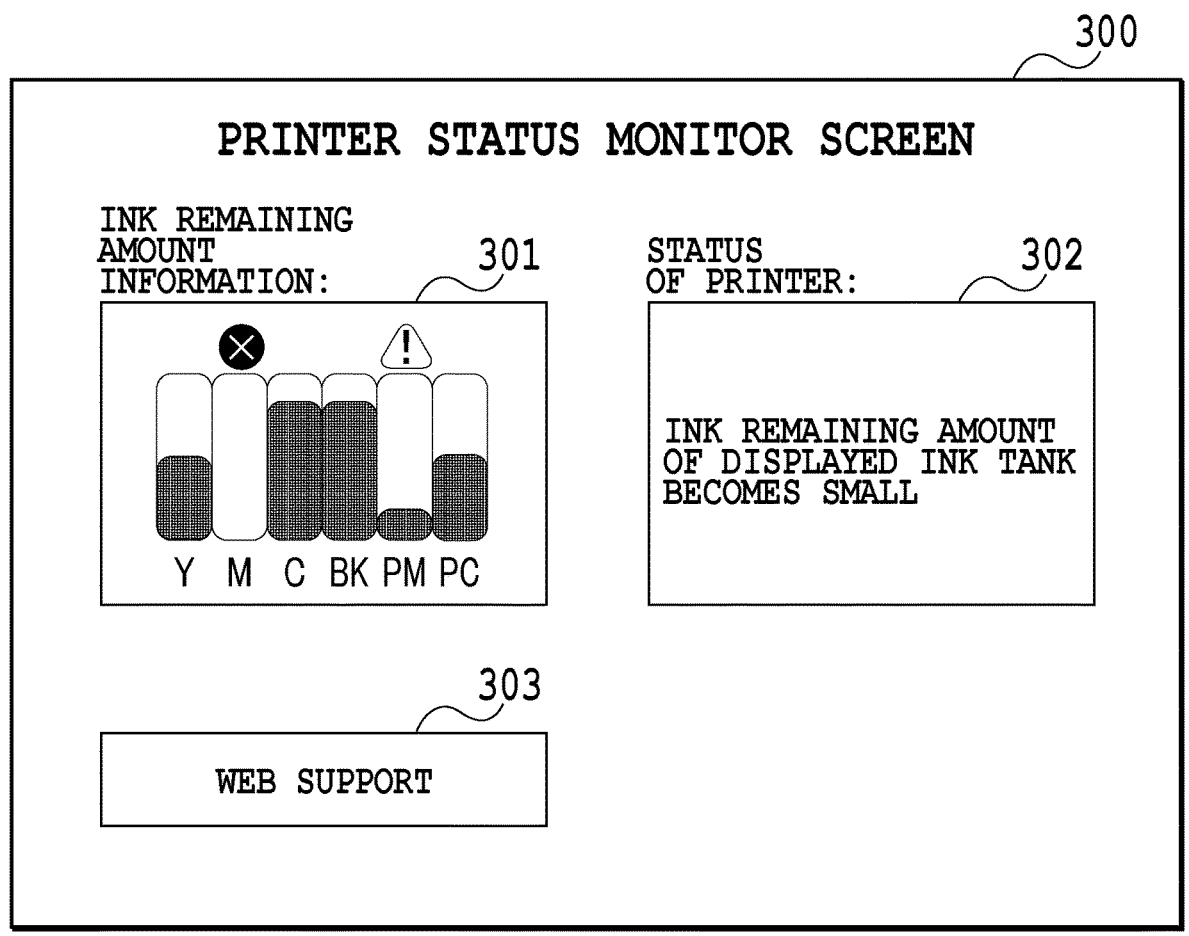
FIG. 3 is a diagram that illustrates one example of a printer status screen according to Embodiment 1.

FIG. 3 is a diagram that illustrates one example of a printer status monitor screen displayed on the display unit 205 of the client terminal 110. The printer status monitor screen 300 illustrated in FIG. 3 is, for example, a screen that is displayed on the display unit 205 by the status monitor 112 in a case where the remaining amount of ink becomes small or paper jam or the like occurs during a printing operation of the printer 114. In addition, also in a case where a user inputs a start direction for starting the status monitor 112 at an arbitrary timing, or in a case where the printer 114 starts a printing operation, the status monitor 112 can display the screen illustrated in FIG. 3 on the display unit 205.

On the printer status monitor screen 300 illustrated in FIG. 3, the status of the printer 114 connected to the client terminal 110 is displayed. A status display area 301 is a display area used for illustrating the remaining amount of ink in each ink tank mounted in the printer 114 using a figure, an animation, or the like. A status display area 302 is a display area used for illustrating the status of the printer 114 using a sentence or the like. In the example of the printer status monitor screen 300 illustrated in FIG. 3, the remaining amount of ink is displayed for each of the colors of ink tanks mounted in the printer 114. Here, in the status display area 301, the display of the remaining amount of ink such as a sufficient amount (FULL), about a half (HALF), a small amount (LOW), or no remaining amount (OUT) of ink is displayed in an indicator form. In addition, in a case where the remaining amount of ink is small (LOW) or no remaining amount (OUT), the status monitor 112 displays an icon "!" or "×" near the indicator, thereby providing a more intuitive display for a user.

Figure 4:
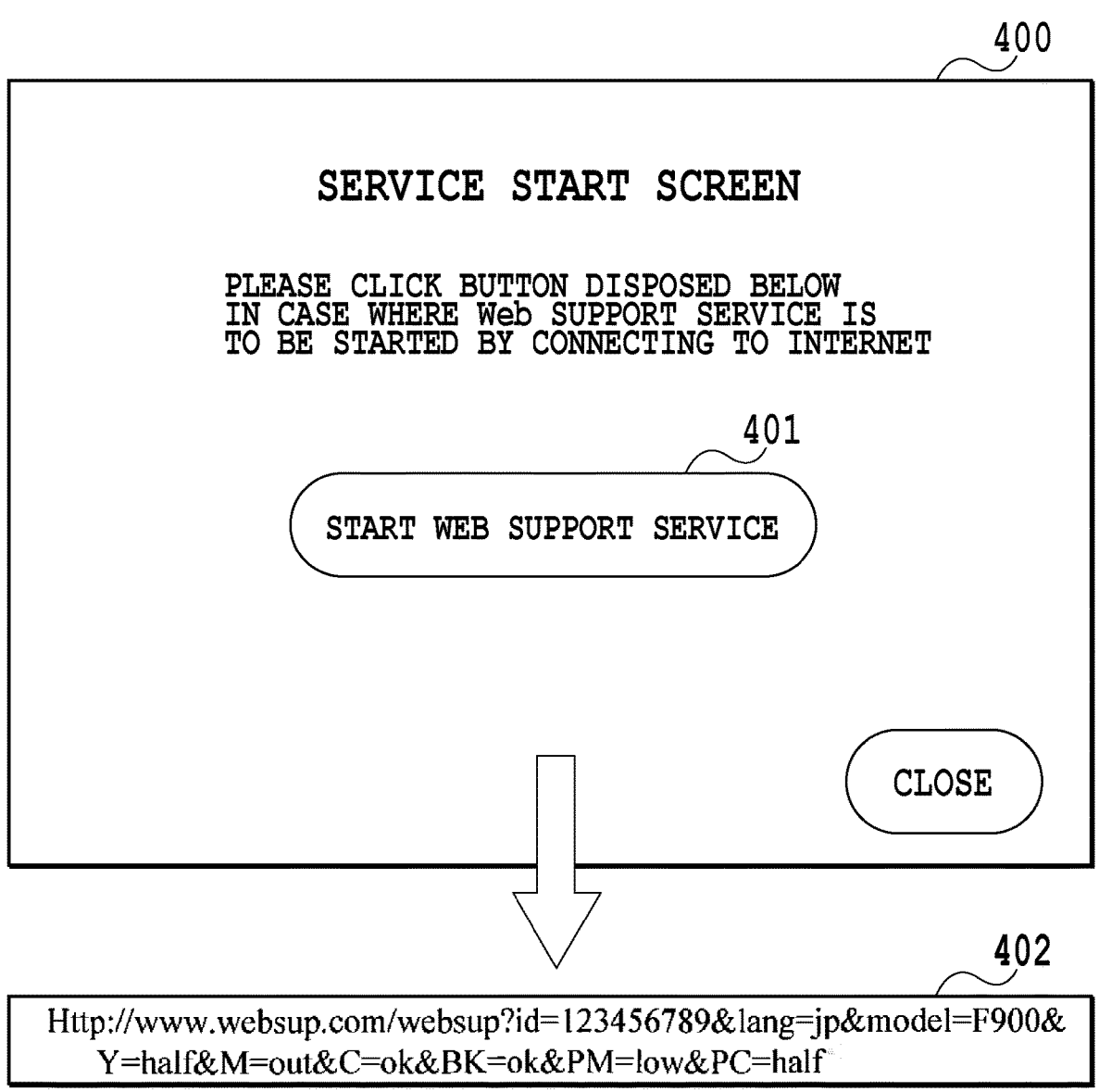
FIG. 4 is a diagram that illustrates one example of a support service start screen according to Embodiment 1.

FIG. 4 is a diagram that illustrates one example of a support service start screen displayed on the web browser 111. A support service start screen 400 illustrated in FIG. 4 is started to be displayed in the web browser 111 in accordance with the pressing of a web support button 303 on the printer status monitor screen 300. The web support service start button 401 is a button that is used for receiving a request for a support service through the Internet. In other words, the web support service start button 401 can be regarded as a button that is used for receiving a display direction for displaying a web service screen. In the present embodiment, first, an explanatory screen (not illustrated in the drawing) regarding the execution of an Internet connection and the transmission of information relating to the printer 114 to each server of the support service providing system 1 is displayed. Then, after a click operation for the approval from a user is performed, the support service start screen 400 illustrated in FIG. 4 is displayed in the web browser 111 (display unit 205).

In accordance with the pressing of the web support service start button 401, an access request for a site providing a support service is transmitted from the web browser 111 to the transfer server 100 through the network 105. In the present embodiment, a web support URL 402 is included in the access request transmitted from the web browser 111.

Figure 5:
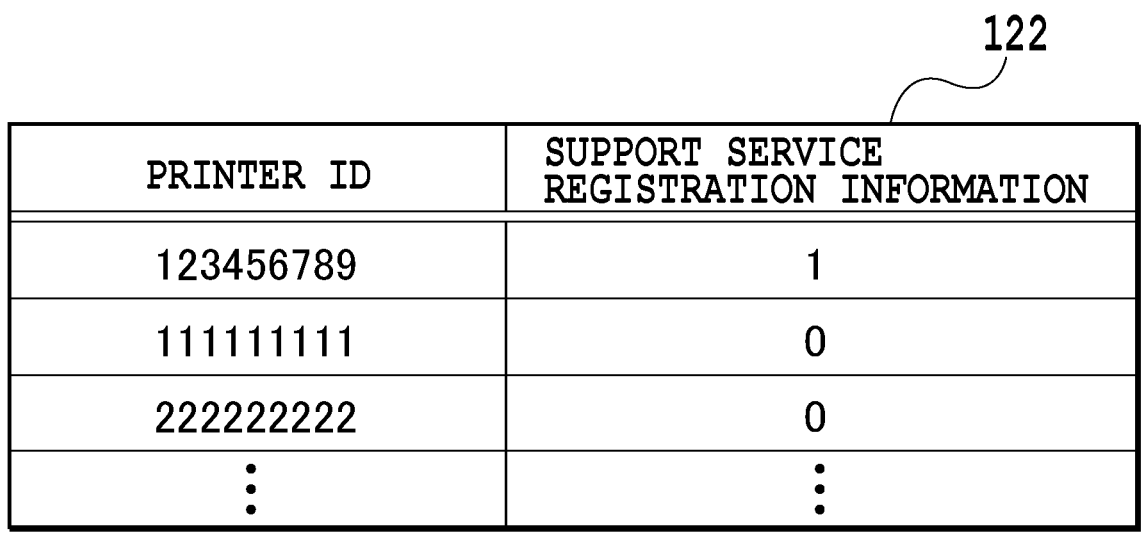
FIG. 5 is a diagram that illustrates one example of a registration information table according to Embodiments 1 and 4.

FIG. 5 is a diagram that illustrates one example of the registration information table 122 according to the present embodiment. In the registration information table 122 illustrated in FIG. 5, a printer ID (identifier) used for uniquely identifying a printer and registration information of a support service are stored in association with each other. In the example of the registration information table 122 illustrated FIG. 5, support service registration information corresponding to a printer ID "123456789" is "1". This represents that a printer 114 having the printer ID "123456789" is registered as a printer that is a target for providing a support service. The support service determination unit 102 can determine whether or not the printer 114 has been registered as a printer that is a target for providing a support service by searching the registration information table 122 using a printer ID assigned to the printer 114. In addition, in the present embodiment, it is assumed that a record corresponding to each printer ID has been registered in advance in the information management server 120 before the web support service start button 401 is pressed. A support service according to the present embodiment can be regarded, so to speak, as a support service requiring in-advance registration. In addition, in the present embodiment, as a support service requiring in-advance registration, a service of automatically delivering a consumable supply (ink or the like) of a printing device will be described as an example. In other words, in the present embodiment, a printing device of which the service registration information is managed as "1" is a service target device to which a consumable supply is automatically delivered.

FIG. 6 is a diagram that illustrates one example of the transfer destination table 103 according to the present embodiment. In the transfer destination table 103 illustrated in FIG. 6, support service registration information, a support service URL basic portion, and adding arguments are stored in association with each other. In the example of the transfer destination table 103 illustrated in FIG. 6, a support service URL basic portion and adding arguments corresponding to support service registration information "1" are respectively "http://www.aaa/support?service=a&", "printer ID", "region", "printer model", and "remaining amount of ink". In the present embodiment, the adding arguments represent the types of arguments added to the support service URL basic portion. The support service determination unit 102 further refers to the transfer destination table 103 on the basis of the support service registration information acquired by referring to the registration information table 122. The support service determination unit 102 generates a support service URL by adding the arguments of types designated in the adding arguments to the support service URL basic portion acquired by referring to the transfer destination table 103.

FIGS. 7A and 7B are diagrams illustrating one example of support service screens displayed on the web browser 111. The screens illustrated in FIGS. 7A and 7B are started to be displayed in the web browser 111 in accordance with the pressing of the web support service start button 401 on the support service start screen 400.

In the present embodiment, in a case where the printer 114 is registered in advance as a target for the automatic delivery service, an ink tank automatic delivery service screen 700*a* illustrated in FIG. 7A is displayed. In this case, an access request from the client terminal 110 is redirected to the support service providing server 130, and screen information of the ink tank automatic delivery service screen 700*a* is generated by the support service screen generation unit 131.

The screen 700*a* illustrated in FIG. 7A includes a model display area 701*a*, a delivery status display area 702*a*, a delivery request reception area 703*a*, and a point balance display area 704*a*, and these areas are selectively displayed. For example, while the model display area 701*a* and the point balance display area 704*a* are constantly displayed, the delivery status display area 702*a* and the delivery request reception area 703*a* are determined to be displayed or not in accordance with the remaining amount of ink transmitted from the client terminal 110. For example, in the example (FIG. 3) of the printer status of the present embodiment, among ink tanks mounted in the printer 114, magenta (M) represents "no remaining amount (OUT)", and photo magenta (PM) represents "small amount (LOW)". At this time, under an automatic delivery support service, automatic order processing of an ink tank for the replacement of magenta (M) is performed, and the delivery status of this ink tank is displayed in the delivery status display area 702*a*. The automatic order processing of an ink tank for replacement will be described later in S904. An ink tank for the replacement of photo magenta (PM) is not a target for the automatic order processing and is displayed in the delivery request reception area 703*a* as a candidate having a high possibility of being requested to be delivered from a user. In the example of the ink tank automatic delivery service screen 700*a* illustrated in FIG. 7A, the quantity of ink tanks corresponding to photo magenta (PM) is displayed as "1" in advance.

Meanwhile, in the present embodiment, in a case where the printer 114 has not been registered in advance as a target for the automatic delivery service of ink tanks for replacement, an ink tank purchase reception screen 700*b* illustrated in FIG. 7B is displayed. In this case, an access request from the client terminal 110 is redirected to the support service providing server 140, and screen information of the ink tank purchase reception screen 700*b* is generated by the support service screen generation unit 141.

The screen 700*b* illustrated in FIG. 7B includes a model display area 701*b* and a product list display area 702*b*, and these areas are constantly displayed on the screen 700*b*. Out of these, in the product list display area 702*b*, the quantities of ink tanks corresponding to the remaining amounts of ink transmitted from the client terminal 110 are displayed. For example, in the example (FIG. 3) of the printer status according to the present embodiment, among ink tanks mounted in the printer 114, magenta (M) represents "no remaining amount (OUT)", and photo magenta (PM) represents "small amount (LOW)". At this time, corresponding quantities of ink tanks for replacement of magenta (M) and photo magenta (PM) are respectively displayed as "1" as candidates having a high possibility of being ordered by a user.

Figure 8:
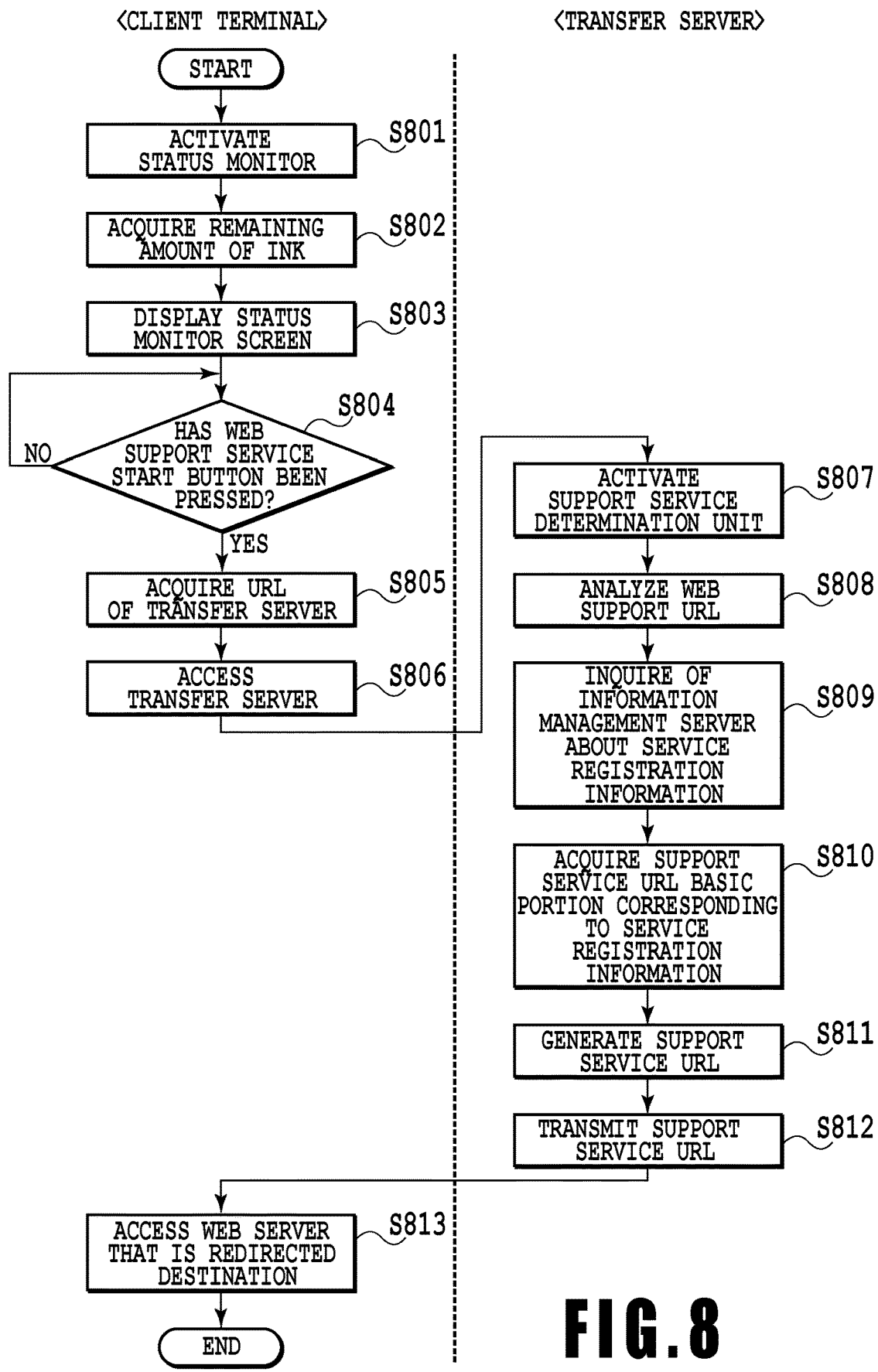
FIG. 8 is a flowchart that illustrates the processing sequences of a client terminal and a transfer server according to Embodiment 1.

FIG. 8 is a flowchart that illustrates the processing sequences of the client terminal 110 and the transfer server 100 according to the present embodiment until accessing the support service providing servers 130 and 140 after the web support service start button 401 is pressed. The process represented by the flowchart illustrated in FIG. 8 is performed as the CPU 201 of each of the client terminal 110 and the transfer server 100 loads a program code stored into the ROM 203 or the HDD 206 into the RAM 202 and executes the program. Each reference letter "S" represents a step in the flowchart. This similarly applies also to flowcharts of FIG. 8 and subsequent drawings.

In S801, in a case where an event to be presented to a user occurs in the printer 114, the CPU 201 of the client terminal 110 activates the status monitor 112. Alternatively, the status monitor 112 may be manually activated by a user operation regardless of the occurrence of an event. In the present embodiment, a case will be described as an example in which the remaining amount of ink of an ink tank mounted in the printer 114 becomes insufficient as an event to be presented to a user.

In S802, the CPU 201 of the client terminal 110 communicates with the printer driver 113 by using the status monitor 112 and acquires the remaining amounts of ink of the ink tanks mounted in the printer 114. The status monitor 112 can acquire information indicating the level of the remaining amount of ink. For example, information indicating one of four levels such as "FULL" of a case where the remaining amount of ink is sufficient, "HALF" of a case where the remaining amount of ink is about half, "LOW" of a case where the remaining amount of ink is small, and "OUT" of a case where there is no remaining amount of ink is acquired.

In S803, the CPU 201 of the client terminal 110 displays the printer status monitor screen 300 on the display unit 205. On the printer status monitor screen 300, the remaining amounts of ink acquired in S802 are displayed in the status display area 301.

In S804, the CPU 201 of the client terminal 110 waits for a user's operation for the web support service start button 401 on the support service start screen 400 displayed in accordance with the pressing of the web support button 303. In a case where the web support service start button 401 is pressed (S804: Yes), the process proceeds to S805. On the other hand, in a case where the web support service start button 401 is not pressed (S804: No), the process is returned to S804 again and waits for a user's operation for the web support service start button 401.

In S805, the CPU 201 of the client terminal 110 acquires the URL of the transfer server 100 that is set when the status monitor 112 is installed in the client terminal 110. In the present embodiment, a case where the URL of the transfer server 100 is "http://www.websup.com/websup" will be described as an example. In addition, the status monitor 112 generates a web support URL by adding predetermined arguments to the URL of the transfer server 100.

In the present embodiment, a printer ID, a driver display language, and a printer model that are acquired from the printer driver 113 and the remaining amount of ink acquired in S802 are added to the URL of the transfer server 100 as arguments. In the example of the web support URL 402 illustrated in FIG. 4, "id=123456789" corresponds to the printer ID. "lang=jp" corresponds to the driver display language. "model=F900" corresponds to the printer model. "Y=half&M=out&C=ok&BK=ok&PM=low&PC=half" correspond to the remaining amounts of ink. Such arguments are added to the URL "http://www.websup.com/websup" of the transfer server 100, and the web support URL 402 illustrated in FIG. 4 is acquired.

In S806, the CPU 201 of the client terminal 110 starts an access to the web server 101 of the transfer server 100 represented by the web support URL through the status monitor 112 and the web browser 111.

In S807, the CPU 201 of the transfer server 100 activates the support service determination unit 102 in accordance with reception of a web support URL in the web server 101 from the client terminal 110.

In S808, the CPU 201 of the transfer server 100 analyzes a web support URL by using the support service determination unit 102. In the present embodiment, the CPU 201 of the transfer server 100 can acquire a printer ID, a driver display language, a printer model, and the remaining amount of ink as a result of the analysis of the web support URL.

In S809, the CPU 201 of the transfer server 100 inquiries of the information management server 120 about support service registration information corresponding to the printer ID by using the support service determination unit 102. More specifically, the CPU 201 of the transfer server 100 searches the registration information table 122 of the information management server 120 by using the printer ID acquired in S808 as a search key. The support service determination unit 102 can acquire the support service registration information corresponding to the printer ID as a result of the search. In the example of the registration information table 122 illustrated in FIG. 5, "1" corresponds to the support service registration information that corresponds to the printer ID "id=123456789".

In S810, the CPU 201 of the transfer server 100 acquires a support service URL basic portion corresponding to the support service registration information acquired in S809 by using the support service determination unit 102. More specifically, the CPU 201 of the transfer server 100 searches the transfer destination table 103 of the transfer server 100 by using the support service registration information acquired in S809 as a search key. The CPU 201 of the transfer server 100 can acquire a support service URL basic portion corresponding to the support service registration information as a result of the search. As described above, in the present embodiment, "1" is acquired as the support service registration information corresponding to the printer ID "id=123456789". For this reason, in the example illustrated in FIG. 6, "http://www.aaa/support?service=a&" corresponds to the support service URL basic portion. At this time, the CPU 201 of the transfer server 100 also acquires types of arguments (adding arguments) that are targets for being added to the support service URL basic portion in addition to the support service URL basic portion.

In S811, the CPU 201 of the transfer server 100 extracts arguments of necessary types from among arguments included in the web support URL in accordance with the types of arguments that are adding targets acquired in S810 by using the support service determination unit 102. Then, the CPU 201 of the transfer server 100 combines the extracted arguments with the support service URL basic portion to generate a support service URL. In the example of the transfer destination table 103 illustrated in FIG. 6, arguments representing "printer ID", "language (lang=jp), "printer model", and "the remaining amount of ink" included in the web support URL 402 are extracted, and the extracted arguments are combined with the support service URL basic portion. As a result, for example, "http://www.aaa/support?service=a&id=123456789&lang=jp&model=F900&Y=half& M=out&C=ok&BK=ok&PM=low&PC=half" and the like are generated as support service URLs.

In S812, the CPU 201 of the transfer server 100 transmits the support service URL generated in S811 to the web browser 111 of the client terminal 110.

In S813, the CPU 201 of the client terminal 110 starts an access to a web server that is a redirect destination represented by the URL in accordance with the reception of the support service URL by using the web browser 111. When S813 ends, the process illustrated in this flowchart ends.

Figure 9:
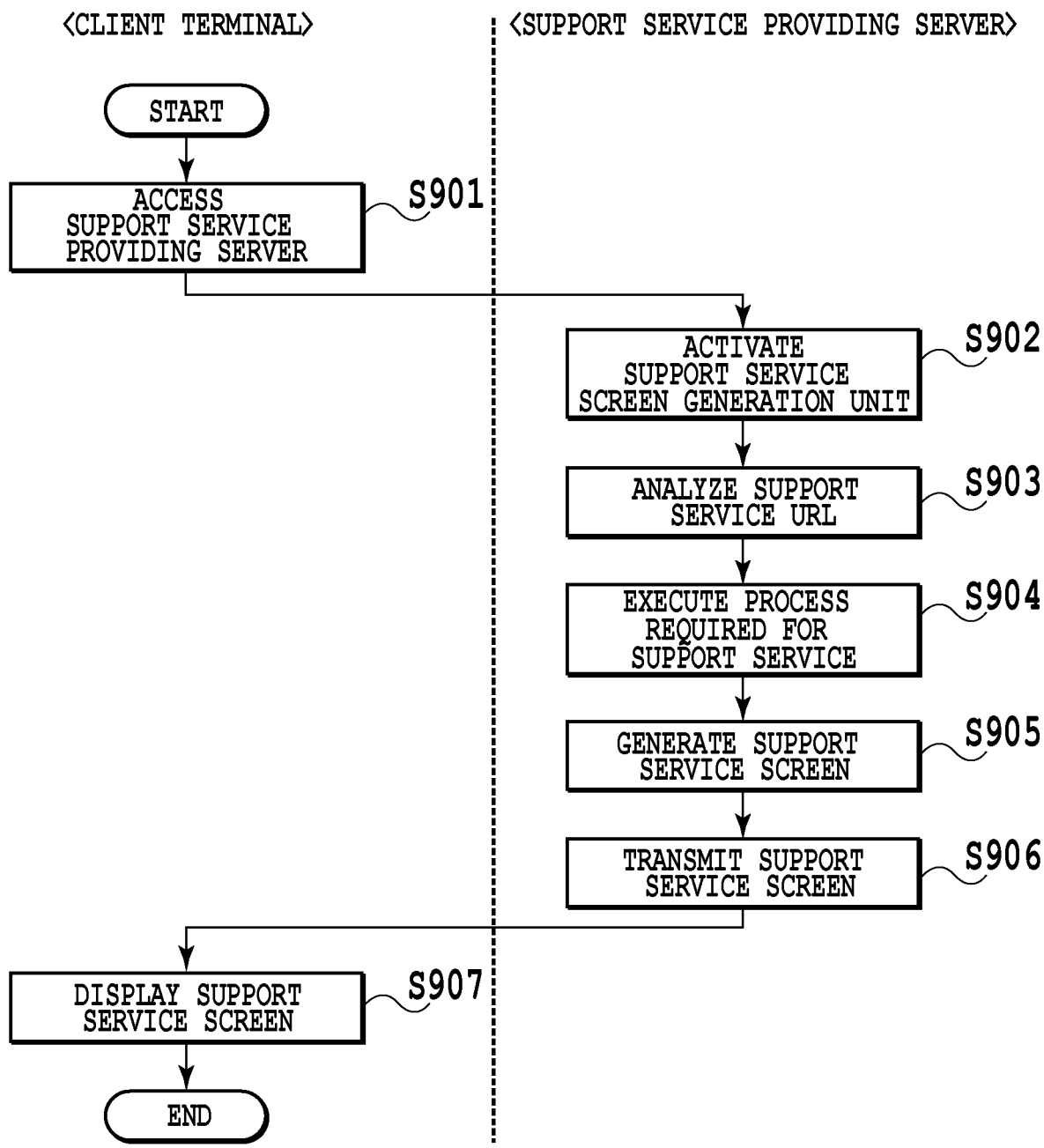
FIG. 9 is a flowchart that illustrates the processing sequences of a client terminal and a support service providing server according to Embodiment 1.

FIG. 9 is a flowchart that illustrates the processing sequences of the client terminal 110 and the support service providing server according to the present embodiment until a support service screen is displayed after the web browser 111 starts accessing the support service providing server. The web browser 111 accesses one of redirect destinations indicated by the support service URLs out of the support service providing servers 130 and 140. In description of the embodiment described below, for the convenience of the description, it will be represented in the form of "support service providing server 130 (140)".

In S901, the CPU 201 of the client terminal 110 starts accessing the web server 132 (142) of the support service providing server 130 (140) represented by the support service URL by using the web browser 111.

In S902, the CPU 201 of the support service providing server 130 (140) activates the support service screen generation unit 131 (141) in accordance with the reception of a support service URL from the web browser 111 in the web server 132 (142).

In S903, the CPU 201 of the support service providing server 130 (140) analyzes the support service URL by using the support service screen generation unit 131 (141). A technique used for analyzing the support service URL is the same as the technique used for analyzing a web support URL in S808, and thus, detailed description thereof will not be presented.

In S904, the CPU 201 of the support service providing server 130 (140) executes a process that is necessary for the support service provided for the printer 114. For example, the CPU 201 of the support service providing server 130 (140) can execute automatic order processing of an ink tank (in the present embodiment, an ink tank of magenta) having no remaining amount of ink by analyzing the support service URL. Here, one example of the automatic order processing will be described. The CPU 201 of the support service providing server 130 (140) can acquire a printer ID and the remaining amount of ink by analyzing the support service URL. The CPU 201 of the support service providing server 130 (140) transmits an ink tank (in the present embodiment, an ink tank of magenta) that is a target of an automatic order and a printer ID to the order reception server that accepts automatic order processing. In the order reception server, personal information of a user receiving a support service and a printer ID are managed in association with each other. For this reason, the order reception server delivers an ink tank (in the present embodiment, an ink tank of magenta) that is an order target to an address specified by personal information associated with the printer ID.

In S905, the CPU 201 of the support service providing server 130 (140) generates screen information of the support service screen by using the support service screen generation unit 131 (141). In the present embodiment, in a case where the printer 114 has been registered in advance as a target for an automatic delivery service of an ink tank for replacement, an access request from the client terminal 110 is redirected to the support service providing server 130. Then, the support service screen generation unit 131 generates screen information (HTML) of the ink tank automatic delivery service screen 700a illustrated in FIG. 7A. Here, the CPU 201 of the support service providing server 130 (140) can specify that the remaining amount of photo magenta is small by analyzing the support service URL. For this reason, screen information for displaying a quantity relating to the order of photo magenta is generated. On the other hand, in the present embodiment, in a case where the printer 114 has not been registered in advance as a target for an automatic delivery service of an ink tank for replacement, an access request from the client terminal 110 is redirected to the support service providing server 140. Then, the support service screen generation unit 141 generates screen information of an ink tank purchase reception screen 700b (HTML) illustrated in FIG. 7B.

In S906, the CPU 201 of the support service providing server 130 (140) transmits the screen information of the support service screen generated in S906 to the web browser 111 by using the support service screen generation unit 131 (141).

In S907, the CPU 201 of the client terminal 110 analyzes the screen information of the support service screen received from the web server 132 (142) by using the web browser 111. Then, the support service screen is displayed in the web browser 111 (display unit 205). When the display of the support service screen in S907 ends, the process illustrated in this flowchart ends.

As described above, the transfer server 100 according to the present embodiment performs a redirection process on the basis of whether or not the printer has been registered as a device that is a target for providing a support service requiring in-advance registration. According to the transfer server 100 of the present embodiment, in a support service providing system, an effect of capable of guiding an access request from a client terminal to a site that is appropriate for the service content to be provided is acquired.

Embodiment 2

The transfer server 100 according to Embodiment 1 determines a redirect destination of an access request received from the client terminal 110 on the basis of the support service registration information. However, a factor used for determining the redirect destination is not limited to the support service registration information. In the present embodiment, an example will be described in which a redirect destination of an access request received from a client terminal 110 is determined on the basis of a region information and a printer model of a printer 114 in addition to support service registration information. Here, description of parts common to Embodiment 1 will be simplified or omitted, and, hereinafter, points that are unique to the present embodiment will be focused in the description.

Figure 10:
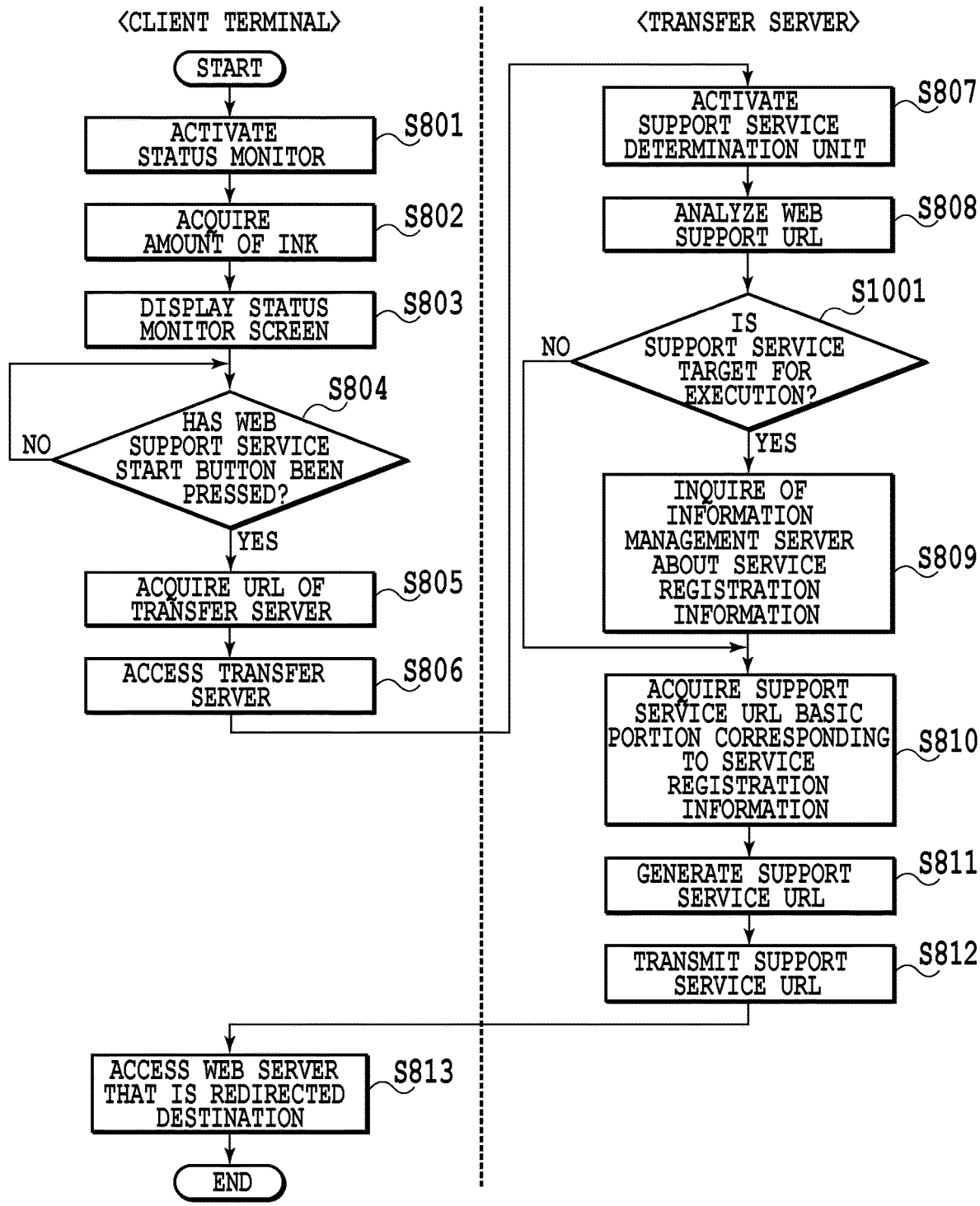
FIG. 10 is a flowchart that illustrates the processing sequences of a client terminal and a transfer server according to Embodiment 2.

FIG. 10 is a flowchart that illustrates the processing sequences of the client terminal 110 and a transfer server 100 according to the present embodiment. Since S801 to S807 are the same as those according to Embodiment 1, description thereof will not be presented.

In S808, a CPU 201 of the transfer server 100 analyzes a web support URL by using a support service determination unit 102. In the present embodiment, the support service determination unit 102 can acquire region information in addition to a result (a printer ID, a driver display language, a printer model, and the remaining amount of ink) of the analysis according to Embodiment 1 as a result of the analysis of the web support URL. Here, the region information according to the present embodiment represents information indicating a region in which the printer 114 was sold, information indicating a region in which the printer 114 is present, or the like. Particularly, the information indicating the region in which the printer 114 is present, for example, can be specified by using the output of a GPS receiver (not illustrated in the drawing) built in the printer 114. Alternatively, the information indicating the region in which the printer 114 is present may be specified based on information that is stored in a ROM or the like of the printer 114 in advance.

In S1001, the CPU 201 of the transfer server 100 determines whether or not the region specified in S808 is a target for the execution of a support service by using the support service determination unit 102. More specifically, the CPU 201 of the transfer server 100 can determine that the region is a target for the execution of a support service in a case where an execution status corresponding to the region specified in S808 is "1" by referring to a support service execution status table illustrated in FIG. 11A. Similarly, the CPU 201 of the transfer server 100 determines whether or not the printer model information specified in S808 is a target for the execution of a support service. More specifically, the CPU 201 of the transfer server 100 can determines that the printer model is a target for the execution of a support service in a case where the execution status corresponding to the printer model is "1" by referring to a support service execution status table illustrated in FIG. 11B. In the present embodiment, while a target for the execution of a support service or not is determined by using two items of "region" and "printer model", a target for the execution of a support service or not may be determined by using any one item thereof.

In a case where a target for the execution of a support service is determined (S1001: Yes), the process proceeds to S809. On the other hand, in a case where no target for the execution of a support service is determined (S1001: No), S809 is skipped, and the process proceeds to S810. In such a case, the CPU 201 of the transfer server 100 acquires a support service URL basic portion corresponding to the region information or the printer model information by referring to the support service execution status tables (FIGS. 11A and 11B) by using the support service determination unit 102. In the present embodiment, for example, "http://www.def/nosupport?" is acquired as the support service URL basic portion. S811 and subsequent steps are the same as those according to Embodiment 1, and thus, description thereof will not be presented.

As described above, in a case where the support service is determined not to be provided originally, the transfer server 100 according to the present embodiment does not inquire an information management server or the like. According to the transfer server 100 according to the present embodiment, in addition to the effects of Embodiment 1, the process of redirecting an access request received from the client terminal can be performed more efficiently.

Embodiment 3

The transfer server 100 according to Embodiment 1 acquires the support service registration information from the information management server 120. For this reason, in a case where communication between the transfer server 100 and the information management server 120 cannot be performed, there are cases where the transfer server 100 cannot acquire the support service registration information and cannot guide an access request from a client terminal to an appropriate redirect destination. In the present embodiment, an example will be described in which, in a case where a transfer server 100 cannot communicate with an information management server 120, an access request from a client terminal is guided to an appropriate redirect destination on the basis of support service registration information retained by the transfer server 100. Here, description of parts common to embodiments described above will be simplified or omitted, and, hereinafter, points that are unique to the present embodiment will be focused in the description.

Figure 12B:
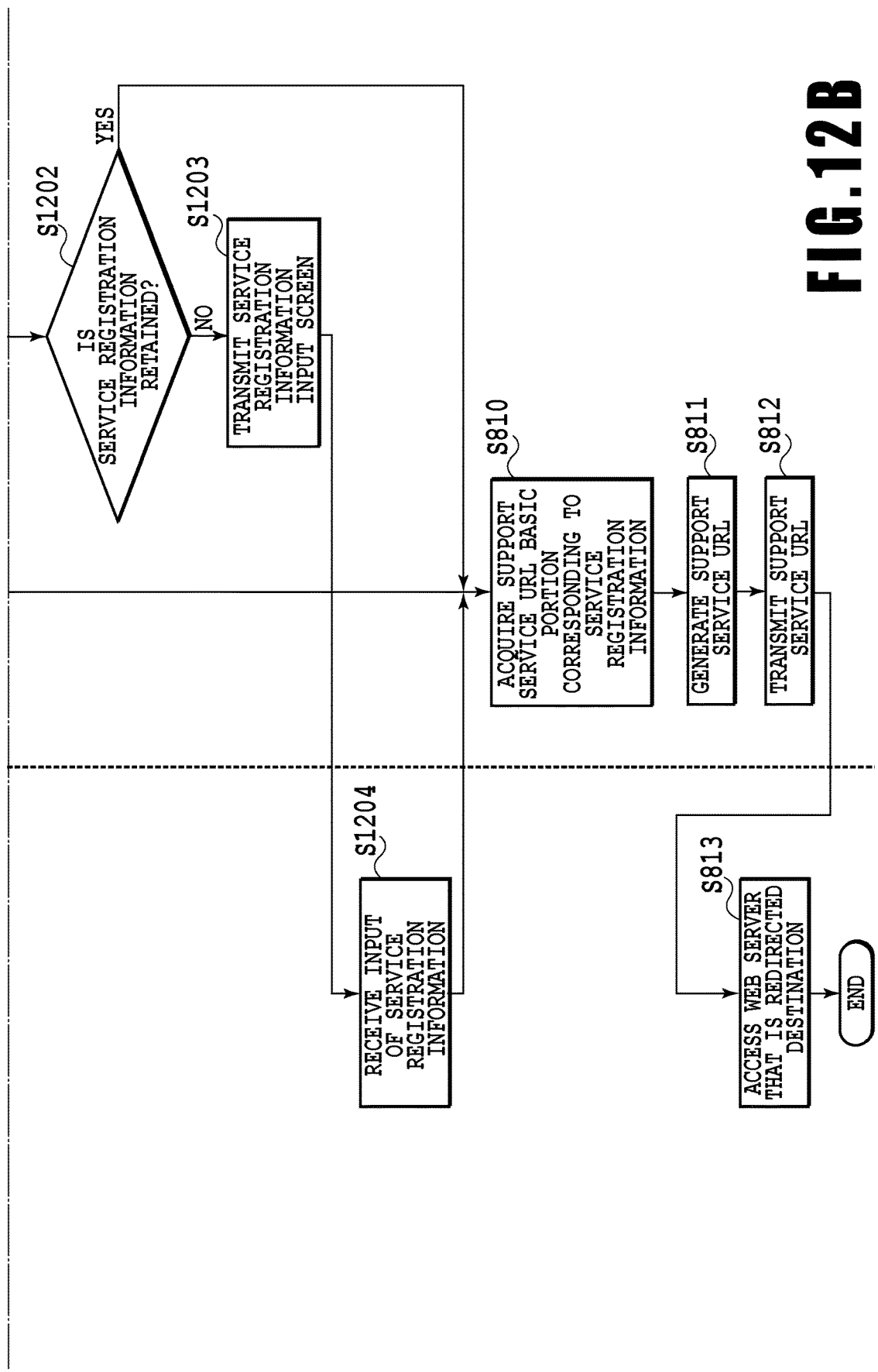
FIG. 12B is a flowchart that illustrates the processing sequences of a client terminal and a transfer server according to Embodiment 3.

FIG. 12 is a diagram showing the relationship of FIGS. 12A and 12B. FIGS. 12A and 12B are flowcharts that illustrate the processing sequences of a client terminal 110 and the transfer server 100 according to the present embodiment. Since S801 to S809 are the same as those according to Embodiment 1, description thereof will not be presented.

In S1201, a CPU 201 of the transfer server 100 determines whether or not the information management server 120 is connectable by using a web server 101. In a case where the information management server 120 is connectable (S1201: Yes), the process proceeds to S810. On the other hand, in a case where the information management server 120 is unconnectable (S1201: No), the process proceeds to S1202.

In S1202, the CPU 201 of the transfer server 100 determines whether or not a support service corresponding to a printer ID acquired in S808 is registered by using a support service determination unit 102. More specifically, the CPU 201 of the transfer server 100 searches a registration information retaining table 104 by using the printer ID acquired in S808 and determines whether or not a support service corresponding to the printer ID is registered.

Here, the registration information retaining table 104 according to the present embodiment will be described with reference to FIG. 13. Every time when support service registration information is acquired from the information management server 120, the CPU 201 of the transfer server 100 according to the present embodiment stores the acquired support service registration information in the registration information retaining table 104. By retaining the registration information retaining table 104, the transfer server 100 can refer to the latest support service registration information (for example, support service registration information of the previous time) even in a case where an access to the information management server 120 cannot be made.

In the registration information retaining table 104 illustrated in FIG. 13, a printer ID (identifier) used for uniquely identifying a printer and registration information of a support service are stored in association with each other. In the example of the registration information table illustrated in FIG. 13, the latest registration information of a support service A corresponding to a printer ID "123456789" is "a", and latest registration information of a support service B is "b". This represents that a printer 114 having the printer ID "123456789" is registered as a printer that is a target for providing the support services A and B.

In a case where the support service registration information is retained (S1202: Yes), the process proceeds to S810. On the other hand, in a case where the support service registration information is not retained (S1202: No), in S1203, the CPU 201 of the transfer server 100 generates screen information (HTML) of an input screen of the support service registration information by using the web server 101. Then, the screen information (HTML) of the input screen of the support service registration information is transmitted to the client terminal 110.

In S1204, the CPU 201 of the client terminal 110 analyzes the screen information received from the web server 101 by using a web browser 111 and displays the input screen of the support service registration information in the web browser 111. Then, the web browser 111 receives an input of the support service registration information of the printer 114 through a user operation and transmits the support service registration information of which the input has been received to the transfer server 100. The process of S810 and subsequent steps is the same as that according to Embodiment 1, and description thereof will not be presented.

As described above, even in a case where communication with the information management server 120 cannot be performed, the transfer server 100 according to the present embodiment can guide an access request from a client terminal to an appropriate redirect destination by retaining the latest support service registration information. According to the transfer server 100 of the present embodiment, in addition to the effects of the embodiments described above, the process of redirecting an access request from a client terminal can be appropriately performed regardless of the communication state between the transfer server 100 and the information management server 120.

Other Embodiments

In the embodiments described above, although examples in which a support service relating to the printer 114 connected to the client terminal 110 is supported have been described, a target device is not limited to a printer. For example, the embodiments may be applied also to a device such as a copier or a facsimile device as a target. As consumable supplies of the copier or the facsimile device, for example, there are paper sheets used for printing.

In addition, in the embodiments described above, while a support service has been described as an example, the embodiment may be applied to any other service.

Furthermore, in the embodiments described above, while an automatic delivery service of ink tanks has been described as an example, any other consumable supply relating to printing may be automatically delivered. For example, the consumable supply may be ink or paper sheets.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

According to a transfer server of the present invention, an effect of being capable of guiding an access request from a client terminal to an appropriate site matching a provided service content in a support service system can be acquired.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-029403, filed Feb. 20, 2017, which is hereby incorporated by reference wherein in its entirety.

What is claimed is:

1. A method of controlling a transfer server which processes an access request from a client terminal, the method comprising:
  receiving an access request to a service relating to a printing device connected to the client terminal, wherein the access request is transmitted from the client terminal to the transfer server in a case where a user operates a predetermined operation item displayed by the client terminal;
  determining whether or not the printing device is registered as a target device for a service of automatically delivering consumable supply based on the access request;
  generating a first address corresponding to the service of automatically delivering the consumable supply based on a determination by the determining step that the printing device is registered as the target device for the service of automatically delivering the consumable supply, wherein display of a screen corresponding to the first address includes information of a consumable supply delivering condition;
  generating a second address corresponding to a service of purchasing the consumable supply different from the service of automatically delivering the consumable supply based on a determination by the determining step that the printing device is not registered as the target device for the service of automatically delivering the consumable supply, wherein display of a screen corresponding to the second address includes a designation item to accept designation of purchase quantity of the consumable supply; and
  transmitting the first address or the second address to the client terminal.

2. The control method according to claim 1, further comprising analyzing an address of the transfer server used in the access request and acquiring information relating to the printing device added to the address.

3. The control method according to claim 2, wherein the step of determining whether or not the printing device is registered as the target device for the service of automatically delivering the consumable supply includes using an identifier of the printing device, wherein the information relating to the printing device includes at least the identifier used for uniquely identifying the printing device.

4. The control method according to claim 2,
  wherein the information relating to the printing device includes at least information indicating a remaining amount of a consumable supply of the printing device, and
  in generating the first address, the information indicating the remaining amount of the consumable supply is added.

5. The control method according to claim 1, wherein the consumable supply is an ink.

6. The control method according to claim 1, wherein automatic order processing of an ink is performed by the service of automatically delivering.

7. A transfer server processing an access request from a client terminal, the transfer server comprising:
  a reception unit configured to receive an access request to a service relating to a printing device connected to the client terminal, wherein the access request is transmitted from the client terminal to the transfer server in a case where a user operates a predetermined operation item displayed by the client terminal;
  a determination unit configured to determine whether or not the printing device is registered as a target device for a service of automatically delivering consumable supply based on the access request;
  a generation unit configured to generate a first address corresponding to the service of automatically delivering the consumable supply based on the determination unit determining that the printing device is registered as the target device for the service of automatically delivering the consumable supply, wherein display of a screen corresponding to the first address includes information of a consumable supply delivering condition, and to generate a second address corresponding to a service of purchasing the consumable supply different from the service of automatically delivering the consumable supply based on the determination unit determining that the printing device is not registered as the target device for the service of automatically delivering the consumable supply, wherein display of a screen corresponding to the second address includes a designation item to accept designation of purchase quantity of the consumable supply; and
  a transmission unit configured to transmit the first address or the second address to the client terminal,
  wherein the reception unit, the generation unit and the transmission unit are performed by at least one processor of the transfer server.

8. The transfer server according to claim 7, further comprising an acquisition unit configured to analyze an address of the transfer server used in the access request and acquire information relating to the printing device added to the address.

9. The transfer server according to claim 8, wherein the determination unit determines whether or not the printing device is registered as the target device for the service of automatically delivering the consumable supply using an identifier of the printing device, wherein the information relating to the printing device includes at least the identifier used for uniquely identifying the printing device.

10. The transfer server according to claim 8, wherein the information relating to the printing device includes at least information indicating a remaining amount of a consumable supply of the printing device, and the generation unit generates the first address to which the information indicating the remaining amount of the consumable supply is added.

11. The transfer server according to claim 1, wherein the consumable supply is an ink.

12. The transfer server according to claim 1, wherein automatic order processing of an ink is performed by the service of automatically delivering.

13. A system which includes a transfer server processing an access request from a client terminal and a printing device,
wherein the transfer server comprises:
a reception unit configured to receive an access request to a service relating to the printing device connected to the client terminal, wherein the access request is transmitted from the client terminal to the transfer server in a case where a user operates a predetermined operation item displayed by the client terminal;
a determination unit configured to determine whether or not the printing device is registered as a target device in a service of automatically delivering consumable supply based on the access request,
a generation unit configured to generate a first address corresponding to the service of automatically delivering the consumable supply based on the determination unit determining that the printing device is registered as the target device for the service of automatically delivering the consumable supply, wherein display of a screen corresponding to the first address includes information of a consumable supply delivering condition, and to generate a second address corresponding to a service of purchasing the consumable supply different from the service of automatically delivering the consumable supply based on the determination unit determining that the printing device is not registered as the target device for the service of automatically delivering the consumable supply, wherein display of a screen corresponding to the second address includes a designation item to accept designation of purchase quantity of the consumable supply; and
a transmission unit configured to transmit the first address or the second address to the client terminal,
wherein the reception unit, the generation unit and the transmission unit are performed by at least one processor of the transfer server; and
wherein the printing device comprises:
a communication unit configured to communicate with the client terminal,
wherein the communication unit is performed by at least one processor of the printing device.

14. The system according to claim 13, further comprising an acquisition unit configured to analyze an address of the transfer server used in the access request and acquire information relating to the printing device added to the address.

15. The system according to claim 14, wherein the determination unit determines whether or not the printing device is registered as the target device for the service of automatically delivering the consumable supply using an identifier of the printing device,
wherein the information relating to the printing device includes at least the identifier used for uniquely identifying the printing device.

16. The system according to claim 14, wherein the information relating to the printing device includes at least information indicating a remaining amount of a consumable supply of the printing device, and
the generation unit generates the first address to which the information indicating the remaining amount of the consumable supply is added.

17. The system according to claim 13, wherein the consumable supply is an ink.

18. The system according to claim 13, wherein automatic order processing of an ink is performed by the service of automatically delivering.

\* \* \* \* \*